Dec. 19, 1961 H. J. ALTWICKER 3,013,657
DIE
Filed March 8, 1957 2 Sheets-Sheet 1
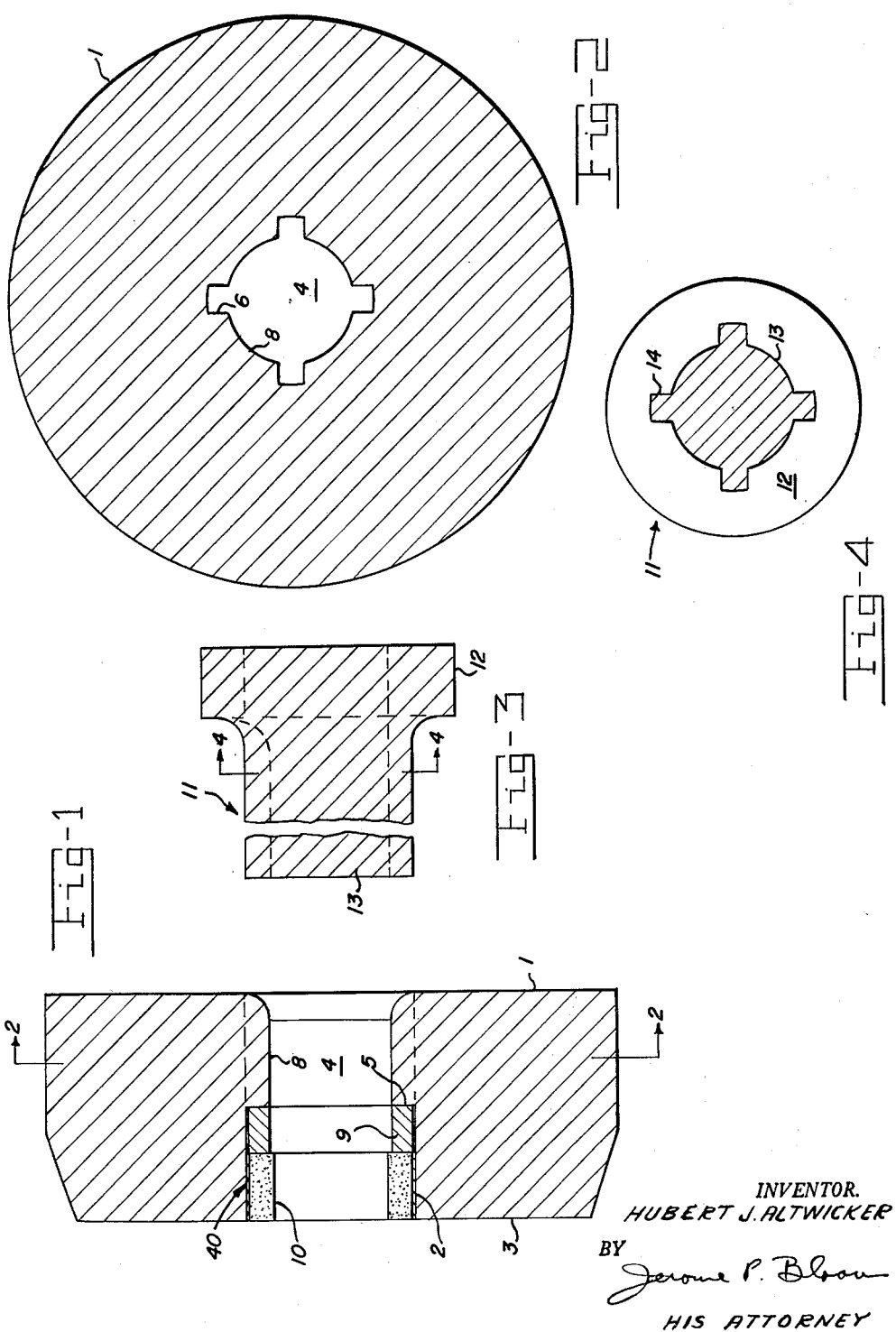
INVENTOR.
HUBERT J. ALTWICKER
BY
Jerome P. Bloom
HIS ATTORNEY

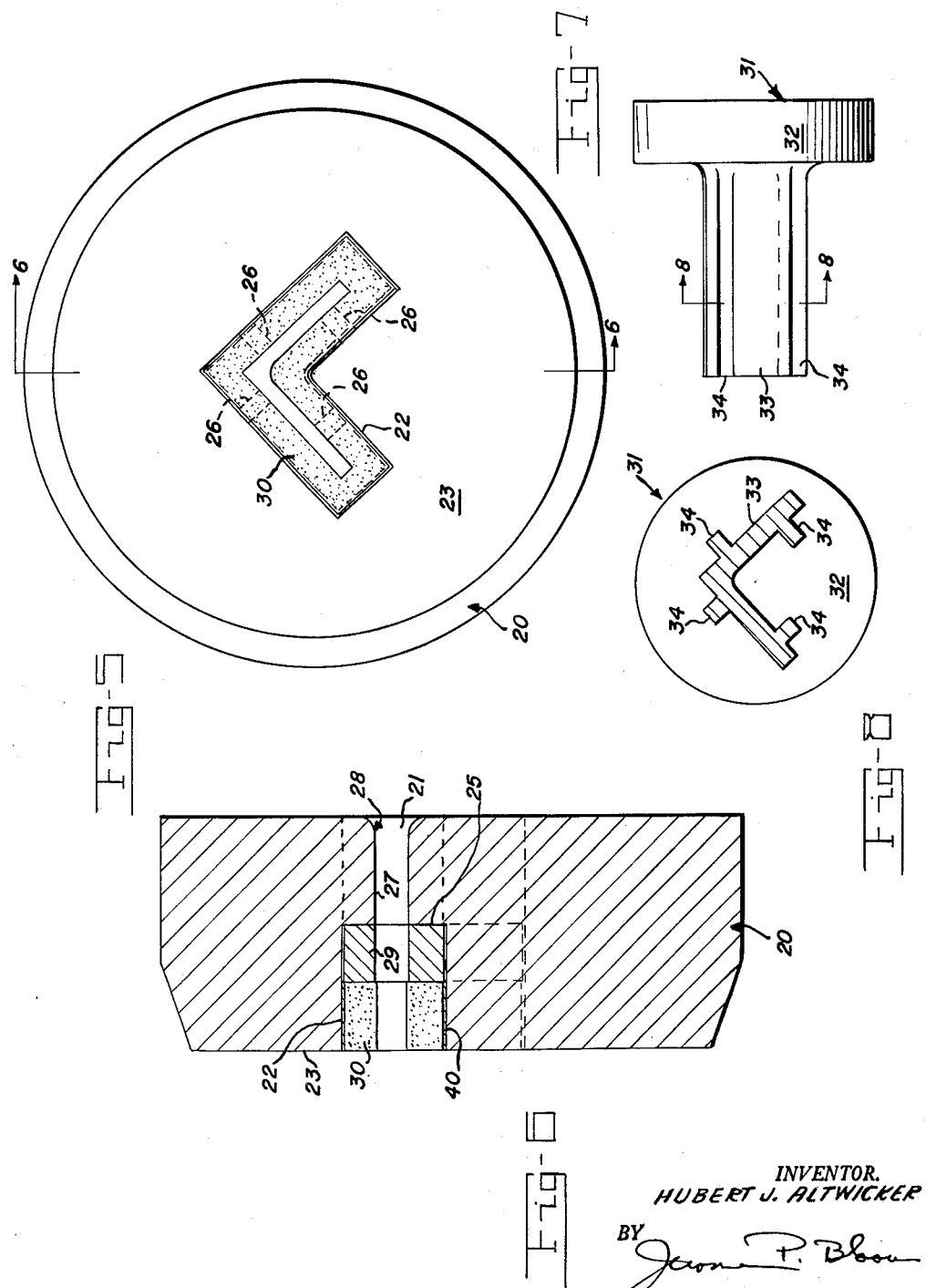

United States Patent Office 3,013,657
Patented Dec. 19, 1961

3,013,657
DIE
Hubert J. Altwicker, 631 Carlisle, Dayton, Ohio
Filed Mar. 8, 1957, Ser. No. 644,928
2 Claims. (Cl. 207—17)

This invention relates to improved dies and more particularly to units wherein the die body has an insert of different composition providing its working surface or surfaces. It enables the fabrication of improved and more versatile dies which are considerably less sensitive to bending and shear stresses, and consequently capable of a longer and more efficient operating life. The subject invention is particularly advantageous in application to die units employing inserts of sintered alumina or the like which are shrunk-fit to the die body. The employment of the invention in this instance provides that the insert is tightly and uniformly fixed in the die body yet quickly and completely removable for replacement.

While the invention will be described herein with reference to extrusion dies having ceramic or carbide inserts, those versed in the art will readily recognize that the scope and application of the invention is not so limited.

The advantages of employing ceramic dies and die inserts of sintered alumina or the like are many. However, it has been found that certain difficulties can present themselves in the use of these die inserts of sintered alumina. For example, to provide an effective extrusion die employing an insert of sintered alumina, the insert must be shrunk-fit to the die body. It is necessary to provide a uniform and tight fit of the insert to the die body. Under shear stresses, which result on shearing the butt end of an extruded section, the conventional plate-like insert is relatively easy to break. Such an insert is also sensitive to bending stresses and temperature. Where the insert is shrunk-fit to the die body it is extremely difficult to remove and replace. The aforementioned difficulties occurring in prior art dies employing inserts create expense, production delay, and an inefficient operating life for the die units of this nature.

The subject invention has been primarily developed to avoid the difficulties of the prior art extrusion dies and the like employing ceramic inserts of materials such as sintered alumina. It provides a uniform and tight fit of the insert to the die body with means interposed which enables ready removal of the insert without breakage and quick replacement thereof when required. The replacement of the ceramic insert as provided by the invention can be made very quickly and under controlled conditions which avoid any changes inside the die cavity that receives the new insert. The die cavity experiences no measurable change in the process of removal of the old insert and a new insert having the same dimensions as the old can be utilized as the replacement. The subject invention also provides an insert to be employed which has a wall thickness considerably smaller than its depth. Thus, a large external surface is provided by the insert enabling a more uniform and tight shrink-fit thereof along with a substantial elimination of sensitivity to bending stress and high resistance to shear stress in operation. Moreover, it is a characteristic of the invention embodiments that a backing is provided for the shrink fitted working insert which is substantially coextensive with its seating surface to thereby provide substantial support therefor where the metal leaves the insert in the extrusion operation.

A primary object of the invention is to simplify and improve the construction as well as the means and method of utilization of extrusion dies having inserts providing their working surface or surfaces whereby such dies may not only be economically manufactured, but will be more efficient and satisfactory in use, adaptable to a greater variety of applications and have a longer operating life with minimum maintenance requirements.

Another object of the invention is to provide an improved extrusion die.

A further object of the invention is to provide an improved die unit employing ceramic or carbide inserts wherein a uniform and tight seating of the insert to the die body obtains in a manner to render it relatively insensitive to bending and shear stresses.

An additional object of the invention is to provide an improved die employing a working insert shrink fitted in a cavity in the die body wherein backup means having a clearance fit are interposed between said insert and the die body and access is provided through the die body for application of ejection pressure to said backup means therethrough whereby to provide for ready and efficient removal of the insert in a manner to avoid any changes in the cavity dimension.

Another object of the invention is to provide a die unit having a ceramic insert or the like providing its working surface or surfaces wherein the insert has a high section-modulus to render the insert insensitive to shear and bending stresses in operation thereof.

Another object of the invention is to provide an improved extrusion die employing a working insert of sintered alumina or the like wherein a uniform shrink-fit of the insert to the die body is provided as well as backup means for the insert having a clearance fit in said die body and the die body is formed to provide access for applying pressure to said insert through said backup means enabling ready and complete removal of the insert without breaking or similar difficulty whereby an insert or similar original dimension can be utilized to immediately and simply replace the removed insert.

Another object of the invention is to provide an improved extrusion die having a ceramic insert providing the working face, backed by a further insert having a clearance fit in the die whereby the ceramic insert may be quickly and easily removed when required.

A further object of the invention is to provide a die possessing the advantageous structural features, the inherent meritorious characteristics and the mode of operation and utilization herein described.

A further object of the invention is to provide a novel application of sintered alumina in fabricating extrusion dies whereby precise and accurate dies may be derived which require little or no machining to effect the accurate dimensioning thereof.

With the above primary and other incidental objects in view, as will more fully appear in the specification, the invention intended to be protected by Letters Patent consists of the features of construction, the parts and combinations thereof, and the mode of operation or utilization, or their equivalents, as hereinafter described or illustrated in the accompanying drawings.

In the drawings wherein is shown illustrative, but obviously not necessarily the only forms of embodiment of the invention;

FIG. 1 is a cross-sectional view of a die unit in accordance with the invention;

FIG. 2 is a cross-sectional view taken along line 2—2 of FIG. 1;

FIG. 3 is a longitudinal cross-section view of an ejector as employed with the die unit of FIG. 1;

FIG. 4 is a cross-sectional view taken on line 4—4 of FIG. 3;

FIG. 5 is a plan view of another extrusion die embodying the sintered alumina insert in accordance with the invention;

FIG. 6 is a cross-sectional view taken along line 6—6 of FIG. 5;

FIG. 7 is a side view of the ejector employed with the extrusion die of FIG. 5; and FIG. 8 is a cross-sectional view taken along line 8—8 of FIG. 7.

The invention can be best described with reference to the accompanying drawings. FIGS. 1–4 illustrate one embodiment of the invention. As shown therein, a steel die body 1 is employed which has a cylindrical die cavity 2 in the operating face 3 to the metal entrance end. Rearwardly from the die cavity 2, an extrusion exit aperture 4 of relatively reduced dimension, defined by the neck 8 of the die body, forms a co-axial extension of the die cavity and opens outwardly of the other face of the die body. The reduction in internal dimension of the die body from the cavity 2 to the aperture 4 inwardly of the die body provides an annular projection or shoulder 5 which affords the base of the die cavity 2. Longitudinal grooves 6, equidistantly spaced at 90° intervals, are provided in the inner wall portion of the die body formed by the neck portion of the die to open from the shoulder 5 and the other face of the die body.

A steel ring insert 9 having an external diameter slightly less than the internal diameter of the die cavity 2 is seated in the die cavity to abut the shoulder 5 provided by the internal neck portion of the die which defines the extrusion aperture. It is of particular consequence that this steel insert is slightly smaller than the receiving cavity in the die body so as to provide it with a clearance fit in said die body. The die body 1 is then heated and a cylindrical tubular insert 10 of sintered alumina or the like is shrunk-fit in the die cavity with one face abutting the outer face of the steel ring 9 and its other face flush with the operating face 3 of the die body 1.

The sintered alumina insert 10 is of such a nature that its wall thickness is relatively thin and its depth is relatively great. As will be noted from the drawings, the internal dimension or the cross-sectional area of the opening in the sintered alumina insert is less than that of the ring 9 and the extrusion aperture 4 defined by the neck of the die body. The internal diameter of the steel ring insert is required to be sufficiently large that any shifting due to its clearance fit will not cause its inner periphery to lie in the path of the material extruded through the insert 10. Prior to the shrink-fit of the insert 10, a bond coating 40 of soft oxide or pure metal is applied about the peripheral wall of the alumina insert. Thus, when the insert is shrunk-fit in the die body in abutment to the steel ring, a complete bond of uniform tight relation obtains between the large external surface of the insert and the die body. In the process the steel ring insert is contained against the shoulder 5 forming the base of the die cavity. The considerable extent of the peripheral surface of the sintered alumina insert 10 in conjunction with the bond coat thereon provides a more uniform and complete as well as tight shrink-fit of the insert to the die body, which establishes the insert in an extremely stable condition relative thereto.

The die unit so provided establishes the grooves 6 in the neck portion 8 of the die body to be in alignment with the shoulder abutting face of the steel ring insert, in uniformly spaced relation thereabout.

FIGS. 3 and 4 of the drawings illustrate an ejector stem employed in conjunction with the die unit of FIGS. 1 and 2 to effect clean and quick removal of the sintered alumina insert as required. This stem 11 as shown has a relatively enlarged cylindrical head 12 on the co-axially extending solid cylinder 13 having a peripheral dimension slightly less than the internal dimension of the aperture 4 in the die body, defined by the neck portion 8 thereof. The cylindrical section 13 is provided with peripheral longitudinal bar projections 14 circularly spaced at 90° intervals about the periphery of the cylinder section 13. These bar projections 14 are of a nature to align with and mate in sliding relation to the grooves 6 in the neck 8 of the die body as will be described. The ejector 11 is preferably made of steel.

As will be readily recognized, the invention embodiment of FIGS. 1–4 of the drawings provides a die unit for use in extruding round bars. As noted previously, the sintered alumina insert employed has a wall thickness considerably smaller than its height or depth. This establishes that there is a minimum area of sintered alumina surface in the operating face of the die unit and the combination of the substantial depth of the insert is such to substantially eliminate the sensitivity of the insert to bending stresses in the extruding operation. Since the height or depth of the insert and its external surface area in contact with the die body is great in a peripheral sense, it sits tighter in the die and can more readily take the stresses coming from shearing of butt ends of extruded sections. Thus, the effect of shear stress is reduced to an absolute minimum.

As can be readily seen, the advantages of the particular configuration of the sintered alumina insert as applied to the die body substantially eliminates the undesirable characteristics of the inserts normally attendant their use in the conventional form and manner.

It is particularly noted that while the illustrative embodiment of the invention is directed to extrusion dies, the invention may be readily applied to forging dies in a similar manner believed obvious to those versed in the art.

Thus, the insert has a longer operating life and a prime advantage of the construction of the die in accordance with the invention is that this insert can be readily replaced. The entire die unit can be placed on top of a ring so as to provide free passage for the insert outwardly from the operating face in the die body. The ejector unit 11 is introduced inwardly of the exit face of the die body 1 with its longitudinal projections 14 sliding in the grooves 6 in the neck of the die body and the cylindrical section 13 riding within the aperture 4 until the end thereof establishes the bar projections 14 in contact with the inner face of the steel ring insert 9. A press force from a small screw or mechanical press can now be applied to the head 12 of the ejector 11 which is uniformly distributed by means of the bar projections 14 through the steel ring insert 9 to the inner end of the sintered alumina insert 10.

This uniform application of force through the clearance fit steel ring causes the sintered alumina insert 10 to easily be pressed from its extremely tight fitting relation to the die body 1 without breakage or fracture. The cavity 2 is thus left clean and free of fragments from the sintered alumina insert. Accordingly, the insert 10 may be replaced by an identical size insert in quick fashion and under controlled conditions which avoids any changes inside the cavity which readily accommodates the new insert. Since the tolerances involved will experience no measurable change in the process, a new insert having the same dimensions as the old can be inserted.

Another embodiment of the invention is illustrated in FIGS. 5–8 of the drawings. A steel die body 20 is provided for use in extruding structural sections having an angular or V-type cross-section. The body 20 accordingly has a central aperture 21 from its exit face which is V-form in cross-section and is defined by a die neck 28. The aperture 21 is expanded to the operating face 23 of the die body from the die neck 28 to provide a die cavity 22 having a substantial depth. The expansion of the portion defining the die cavity relative the neck portion 28, which forms a co-axial extension thereof, provides a shoulder 25. The neck of the die body has longitudinal grooves 26 formed in its inner surface opening at one end from the shoulder 25 at the die cavity and at the other end at the exit face of the die. These grooves are symmetrically and identically placed relative each leg of the V-shaped aperture 21 defined by the neck 28. It will be noted that adjacent the outer extremities of the V that the grooves open to the inner sides of the legs while towards the apex of the V the grooves open to the outer sides of the legs. The grooves 26 are substantially at right angles to the V aperture.

A steel insert 29 having a peripheral dimension and configuration to seat in the die cavity 22 with a clearance fit with respect to the side walls thereof is inserted in the die cavity with its inner face in abutment with shoulder 25 providing the base of the cavity. The steel insert is formed with a V-slot in central relation thereto conforming in dimension to the extrusion aperture 21. An insert 30 of sintered alumina having the same general configuration as the steel insert but having a peripheral dimension to be shrunk-fit in tight relation within the die cavity and a slot dimension of a lesser cross-sectional area than that provided in the steel insert is then applied in the die cavity to have its inner face abut the outer face of the laterally free steel V-shaped insert. As in the first embodiment of the invention, this sintered alumina insert provides the working surfaces of the die unit and has a thickness in the operating face which is relatively small in dimension in comparison to the height or depth of the insert. This minimum area provided in the operating face of the die body results in the many advantages before enumerated including insensitivity to bending stress. It is noted that the sintered alumina insert in this instance is also coated with a soft coating 40 of oxide or pure metal or the like to provide a firm and expansive bond between the relatively large peripheral surface of the sintered alumina insert and the die body per se.

An ejector 31 is illustrated in FIGS. 7 and 8 of the drawings for employment with the die unit of FIGS. 5 and 6. This ejector has a cylindrical head 32. Projecting co-axially in symmetrical fashion relative its central axis is a body element 33 which is V-shaped in cross-section and of a peripheral dimension slightly less than the V aperture 21 defined by the neck portion 28 of the die body 20. The projecting body 33 has symmetrically located bar projections 34 respectively to the inner and outer surfaces of the legs thereof in identical fashion corresponding to the disposition of the longitudinal grooves 26 in the neck of the die body 20.

As in the first embodiment of the invention there is an extremely satisfactory uniform and tight shrink-fit established between the sintered alumina insert and the wall of the die cavity which substantially reduces the shear stress sensitivity to a minimum, and the relative configuration of the sintered alumina insert as to its operating surface at the operating face of the die body and the depth of the sintered alumina insert establishes that sensitivity to bending stresses is substantially eliminated. As in the first embodiment, the clearance fit steel insert 29 provides means for easily forcing the sintered alumina insert from the die body as the ejector element 31 is applied thereto. The projections 34 engage the inner face of the steel insert in balanced fashion.

In forming extrusion dies in accordance with the invention, the ceramic insert employed is preferably fabricated in a manner referred to in my co-pending U.S. application Serial No. 600,771, filed July 30, 1956, relating to "Forging Dies" which is now abandoned.

The ceramic insert 10 or 30, as illustrated herein is originally formed under the viewpoint, that the shrinkage as occurring during sintering is carefully pre-calculated. In doing this, after sintering in a critical temperature range for a critical period of time, dimensions of the insert are obtained that are very close to the finished dimensions and for this reason require little or no machining depending upon the tolerances as prescribed by drawing. On shrink-fit of the insert, which has been made by utilizing a pre-calculated shrinkage a precise working surface is provided in the extrusion die which enables superior extrusions.

The many advantages and economies in the use of the invention are readily apparent. A die capable of working titanium and steel alloys and the like which is efficient, durable and economical obtains.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. An extrusion die assembly comprising a die body having a centrally disposed opening therethrough, said opening being of two aligned portions one of which is of greater area in cross section transverse the die axis than the other, said body having a flat surface ending the portion of the opening of greater cross-sectional area at the junction of said two portions, the wall surface of said die body defining the opening portion of smaller cross-sectional area having uniformly spaced slots therein running parallel to said die axis, said slots being of a depth sufficient to smoothly join along the bottom thereof with the adjacent wall surface of said die body defining said opening portion of greater cross-sectional area, whereby ejection means substantially mating with said wall surface of said die body defining said opening portion of smaller cross-sectional area and the slots therein may be sliding in the die in an axial direction dislodge and eject items assembled in said opening portion of greater cross-sectional area, a backup insert having a centrally disposed aperture therethrough assembled in said die body with one end flat against said flat surface, said backup insert having a clearance fit in said die body, said aperture of said insert having a cross-sectional area at least as large as that of said opening portion of smaller cross-sectional area in said die body, a die insert having a centrally disposed extrusion orifice therethrough, the orifice cross-sectional area being smaller than that of said aperture of said backup insert, said die insert being shrink fitted in said die body in said opening portion of greater cross-sectional area with one end seated flat against the adjacent end of said backup insert and with its other end substantially flush with the outer surface of said die body, said orifice, said aperture of said backup insert and said opening portion of smaller cross-sectional area in said die body being aligned so the projection of said orifice along the direction of said die axis will clear the wall defining said aperture in said backup insert and the wall surface of said die body defining said opening portion of smaller cross-sectional area therein.

2. The structure as claimed in claim 1 wherein said opening portion of smaller cross-sectional area in said die body is cylindrical in outline and said opening portion of larger cross-sectional area in said die body is a counterbore thereto, said die insert being of sintered alumina and provided with a protective coating between its outer peripheral surface and the wall surface of said die body defining said opening portion of larger cross-sectional area therein.

References Cited in the file of this patent

UNITED STATES PATENTS

| | | |
|---|---|---|
| 935,463 | Coolidge | Sept. 28, 1909 |
| 1,096,688 | Dantsizen | May 12, 1914 |
| 2,027,787 | Ridgway et al. | Jan. 14, 1936 |
| 2,150,734 | Unckel | Mar. 14, 1939 |

(Other references on following page)

UNITED STATES PATENTS

| | | |
|---|---|---|
| 2,164,397 | Ganoe | July 4, 1939 |
| 2,164,750 | Nadler | July 4, 1939 |
| 2,232,417 | Unckel | Feb. 18, 1941 |
| 2,281,573 | Gazey | May 5, 1942 |
| 2,708,512 | Schlecht et al. | May 17, 1955 |
| 2,753,261 | Goetzel et al. | July 3, 1956 |
| 2,832,468 | Krause | Apr. 29, 1958 |

FOREIGN PATENTS

| | | |
|---|---|---|
| 546,446 | Great Britain | July 14, 1942 |
| 584,016 | Great Britain | Jan. 6, 1947 |